(12) United States Patent
Wood et al.

(10) Patent No.: US 7,794,605 B2
(45) Date of Patent: Sep. 14, 2010

(54) HORIZONTAL BELT FILTER WITH VACUUM PAN ALIGNMENT

(75) Inventors: Joseph L. Wood, Riverton, UT (US); Jay L. Breinholt, South Jordan, UT (US); Brandon G. Rose, Taylorsville, UT (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 12/214,465

(22) Filed: Jun. 19, 2008

(65) Prior Publication Data

US 2009/0314721 A1 Dec. 24, 2009

(51) Int. Cl.
*B01D 33/04* (2006.01)
(52) U.S. Cl. .................. 210/739; 210/783; 210/143; 210/401; 210/DIG. 3
(58) Field of Classification Search .................. 210/143, 210/400, DIG. 3, 401, 739, 783; 162/202, 162/289, 297, 348; 198/810.03, 835, 807, 198/832, 806; 474/101, 102
See application file for complete search history.

(56) References Cited

U.S. PATENT DOCUMENTS

| | | | | |
|---|---|---|---|---|
| 3,756,415 A | * | 9/1973 | Iwatani | 210/401 |
| 4,737,277 A | * | 4/1988 | Lenac | 210/143 |
| 4,964,988 A | * | 10/1990 | Mueller | 210/401 |
| 5,452,791 A | * | 9/1995 | Morency et al. | 198/835 |
| 5,462,677 A | * | 10/1995 | Benesi | 210/791 |
| 5,494,150 A | * | 2/1996 | McDonell et al. | 198/524 |
| 5,573,667 A | * | 11/1996 | Benesi | 210/400 |
| 5,914,038 A | * | 6/1999 | Orizand | 210/401 |
| 6,575,857 B2 | * | 6/2003 | Sebright et al. | 474/106 |

* cited by examiner

*Primary Examiner*—Matthew O Savage
*Assistant Examiner*—Paul J Durand
(74) *Attorney, Agent, or Firm*—Daniel DeJoseph; Aaron M. Pile (57) ABSTRACT

A mechanism in a horizontal belt filter controls the position of the drainage belt to ensure its alignment with the vacuum pan. A section of belt rollers supporting the drainage belt is mounted on a movable structure capable of shifting the rollers laterally to the degree necessary to compensate for misalignments between the drain holes and the vacuum pan. The control operation is implemented with a detector capable of sensing the position of the drain holes in the belt with respect to the vacuum pan. A signal is sent to an actuator that causes the belt rollers to move laterally in the direction required to maintain alignment of the drain holes with the vacuum pan. A dual-drive system is preferably utilized to provide a more uniform force distribution along the drive pulley and to increase torque, thereby also advantageously increasing the capacity of the filter.

12 Claims, 8 Drawing Sheets

HORIZONTAL BELT FILTER WITH VACUUM PAN ALIGNMENT

BACKGROUND OF THE INVENTION

1. Field of the Invention

This invention relates in general to horizontal belt filters and, in particular, to a belt filter with a movable roller deck for optimizing the alignment of the belt with the vacuum pan underlying the belt.

2. Description of the Related Art

Horizontal belt filters have been used for some time in a variety of applications that require continuous filtration of slurries, such as in processing minerals, ores, chemicals, wastes, food and wood pulp. Belt filters consist of a filter medium overlaying a conveyor belt with drain holes in communication with a vacuum pan. The slurry is fed continuously at one end of the belt and the filtrate is extracted through the drain holes as the belt transports the filtered solids to the discharge end of the belt, where they are discharged.

Figure 1:
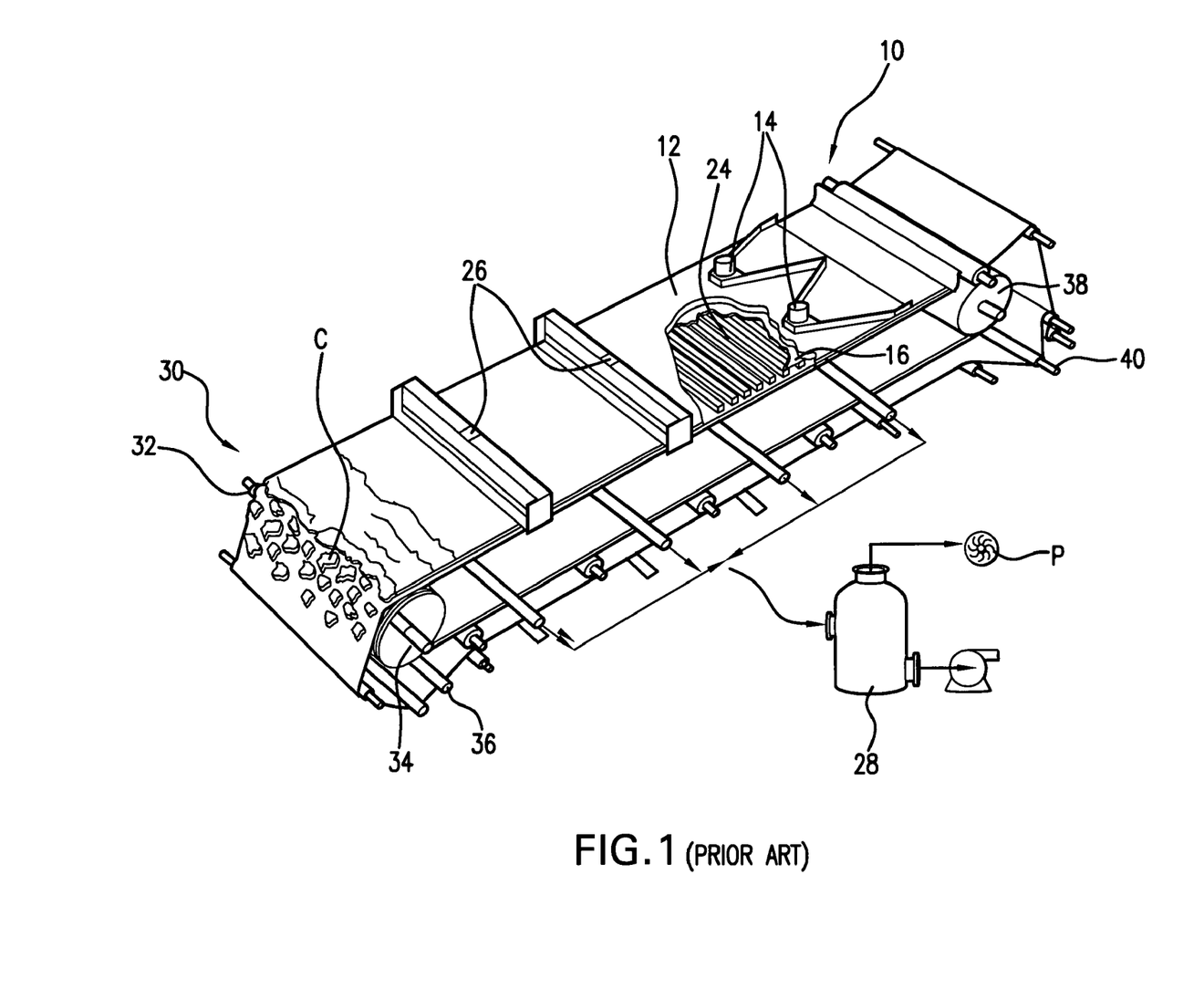
FIG. 1 is a perspective illustration of a conventional horizontal belt filter.

FIG. 1 illustrates the typical configuration of a commercial horizontal belt filter. Feed slurry (typically a water/solid-particle mixture) is uniformly distributed at the system's feed end 10 over the full width of a filter medium 12 by a top-delivery feed system 14 tailored to the particular process requirement. The filter medium 12 is supported by a belt 16 that travels continuously between the feed and the discharge ends of the system. Dewatering of the slurry is accomplished during transport by applying vacuum to the bottom of the belt 16 through a series of drainage holes positioned at the center of the belt.

Figure 2:
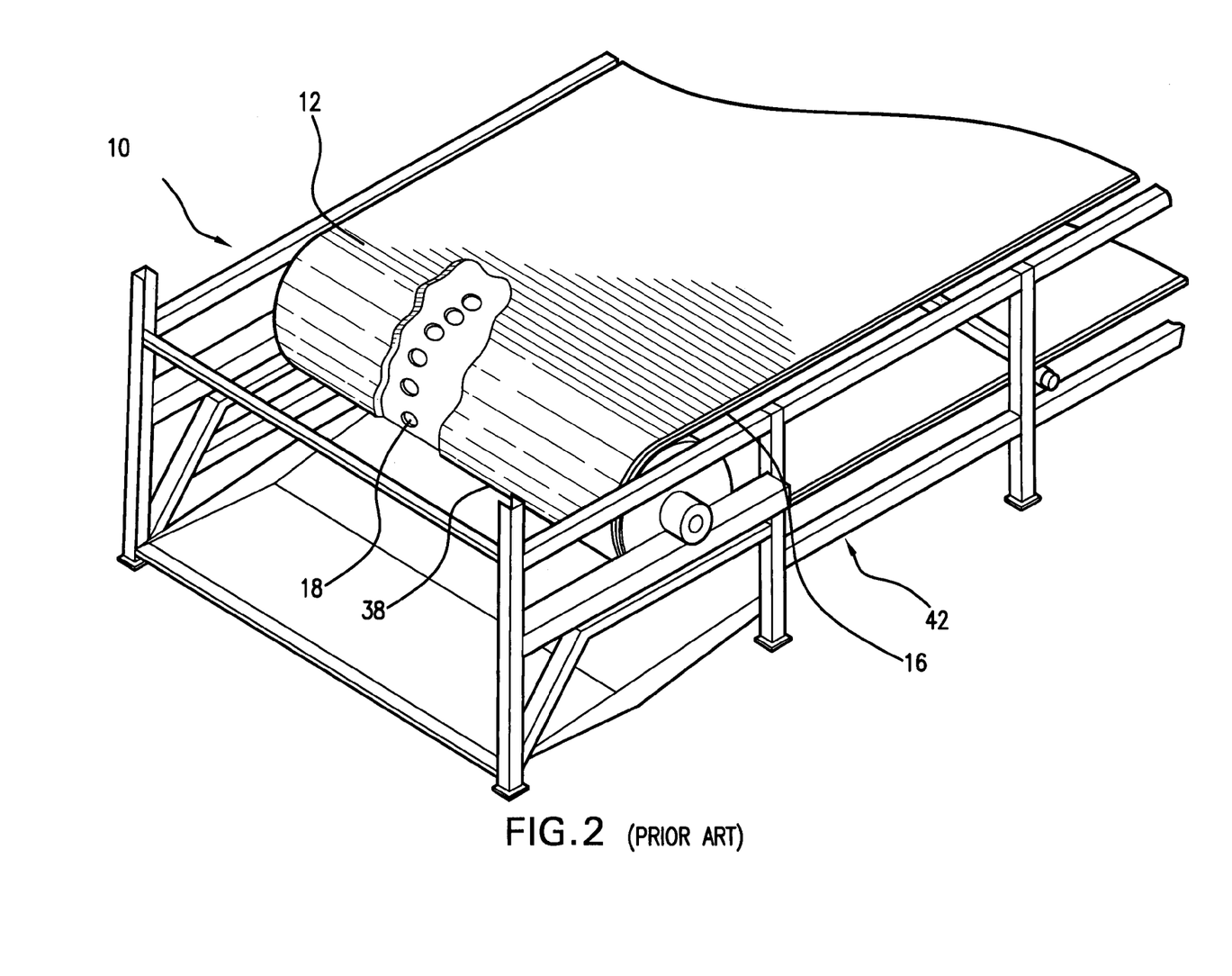
FIG. 2 illustrates in perspective view the feed end of a typical belt-filter structure showing in a cut-away fashion the drain holes in the drainage belt.
Figure 3:
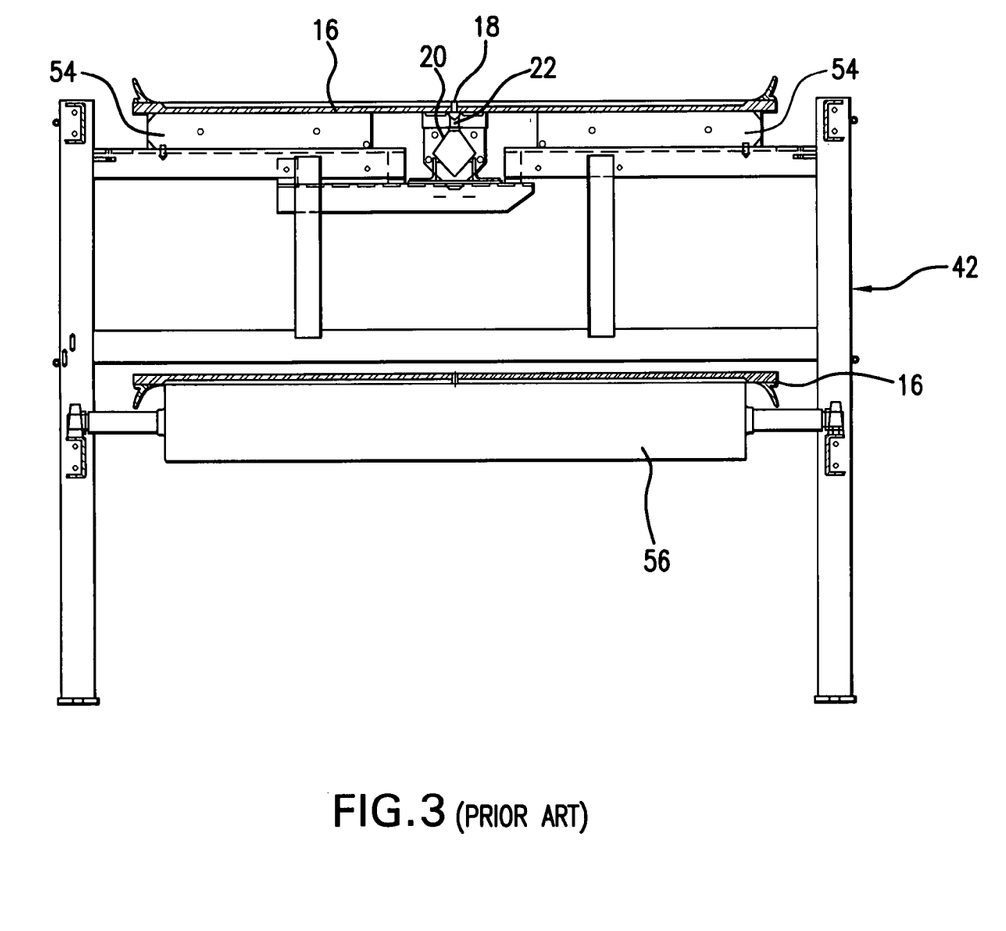
FIG. 3 is a cross-section of a typical belt filter structure showing the vacuum pan in communication with the drain holes in the drainage belt.

As seen clearly in FIG. 2 (through the cut-out filter medium 12) and in the section of FIG. 3 (without the filter medium), such drain holes 18 are typically spaced a few centimeters apart along the longitudinal axis of the belt 16 and are aligned with a vacuum pan 20 underlying the belt. The vacuum pan 20 includes a narrow longitudinal slot 22 facing the bottom of the holes 18 in sealing contact with the underside of the belt 16. The pressure differential created at the vacuum pan by a remote vacuum pump P draws the slurry liquor through the filter medium 12, typically a cloth, along transverse channels 24 in the belt 16 and then through the drain holes 18 centered over the vacuum pan 20. The channels and drain holes are carefully sized to accommodate the hydraulic and pneumatic flow requirements for efficient filtration.

A wash system 26 may be utilized to meet specific process requirements as the cake produced by the dewatered slurry travels down the belt line. Horizontal belt filters may span as much as about 45 meters in length and about 7 meters in width; therefore, multiple washing zones may be utilized along the belt line to optimize product recovery. The filtrate and the air drawn by the vacuum acting on the drain holes 18 are collected in the vacuum pan 20 along the entire length of the drainage belt 16 and further in a collection vessel 28 where the liquid is de-aerated and pumped away from the system. The dewatered cake C is separated from the filter medium 12 at the discharge end 30 of the system as the filter medium rotates around a small discharge-end roller 32 after separating from the drainage belt 16 as the belt revolves around the drive pulley 34. Multiple wash sprays 36 are used to clean the filter medium 12 and the belt 16 on the return side of the system. Continuous tension of the belt 16 is provided by adjusting the position of the take-up pulley 38 at the feed end 10 of the system and the filter medium 12 is similarly kept in tension by a gravity take-up roller 40.

Obviously, the operation and efficiency of horizontal belt systems depend in large measure on the proper alignment of the drain holes 18 with the narrow channel defined by the slot 22 in the vacuum pan 20 underlying the belt line. As those skilled in the art know well, the tension applied to the belt 16 by the drive pulley 34 tends to cause the belt to wander laterally in response to varying friction effects encountered along the line. As soon as a drain hole 18 becomes misaligned with the slot 22 of the vacuum pan, suction from that hole is lost and the efficiency of filtration is reduced. This problem has been particularly pronounced in longer belt filters and the installation of side rollers to contain the belt within a well-defined space has not produced significant improvements. Therefore, this loss of efficiency has limited the development of higher-throughput units. The present invention is directed at solving this problem.

BRIEF SUMMARY OF THE INVENTION

In view of the foregoing, the present invention lies in a mechanism for controlling the position of the drain holes in the drainage belt to ensure their alignment with the vacuum pan throughout the length of the filter line. A section of belt rollers supporting the drainage belt is mounted on a movable structure capable of shifting the rollers laterally to the degree necessary to compensate for the normal misalignments encountered during operation of the belt between the drain holes and the vacuum pan. Thus, if a shift of the drainage belt to one side of the vacuum pan is detected (and therefore also of the drain holes with respect to the slot in the pan, causing loss of suction), a corrective action is undertaken by moving the movable section of rollers in the opposite direction, thereby re-establishing suction and maintaining an efficient operation.

The alignment-control operation is implemented with a detector capable of sensing the position of the drain holes in the belt with respect to the centerline of the vacuum pan. When a shift greater than a predetermined tolerance is detected, a signal is sent to an actuator that causes the belt rollers supporting the belt to move laterally in the direction required to re-align the drain holes with the vacuum pan. A feedback loop between the position sensor and the actuator, with a set-point corresponding to a perfect alignment of the drain holes, ensures that the belt is continuously monitored and its position corrected to maintain suction along its length.

According to another aspect of the invention, a dual-drive system is utilized to provide a more uniform force distribution along the drive pulley, thereby reducing the normal lateral shifting of the drainage belt. The increased torque afforded by the dual-drive system also advantageously makes it possible to increase the length of the belt and correspondingly the capacity of the filter.

Various other purposes and advantages of the invention will become clear from its description in the specification that follows and from the novel features particularly pointed out in the appended claims. Therefore, the invention consists of the features hereinafter illustrated in the drawings, fully described in the detailed description of the preferred embodiments and particularly pointed out in the claims.

DESCRIPTION OF THE PREFERRED EMBODIMENTS OF THE INVENTION

The invention lies in the discovery that the alignment between the drain holes in the drainage belt of a horizontal belt filter and the underlying vacuum pan can be maintained successfully throughout the length of the processing line by shifting laterally a section of rollers supporting the belt. Because the lateral movements of the belt originate mostly as the belt emerges from the take-up pulley at the feed end of the line, the alignment mechanism of the invention is preferably implemented at the feed end of the belt.

Figure 4:
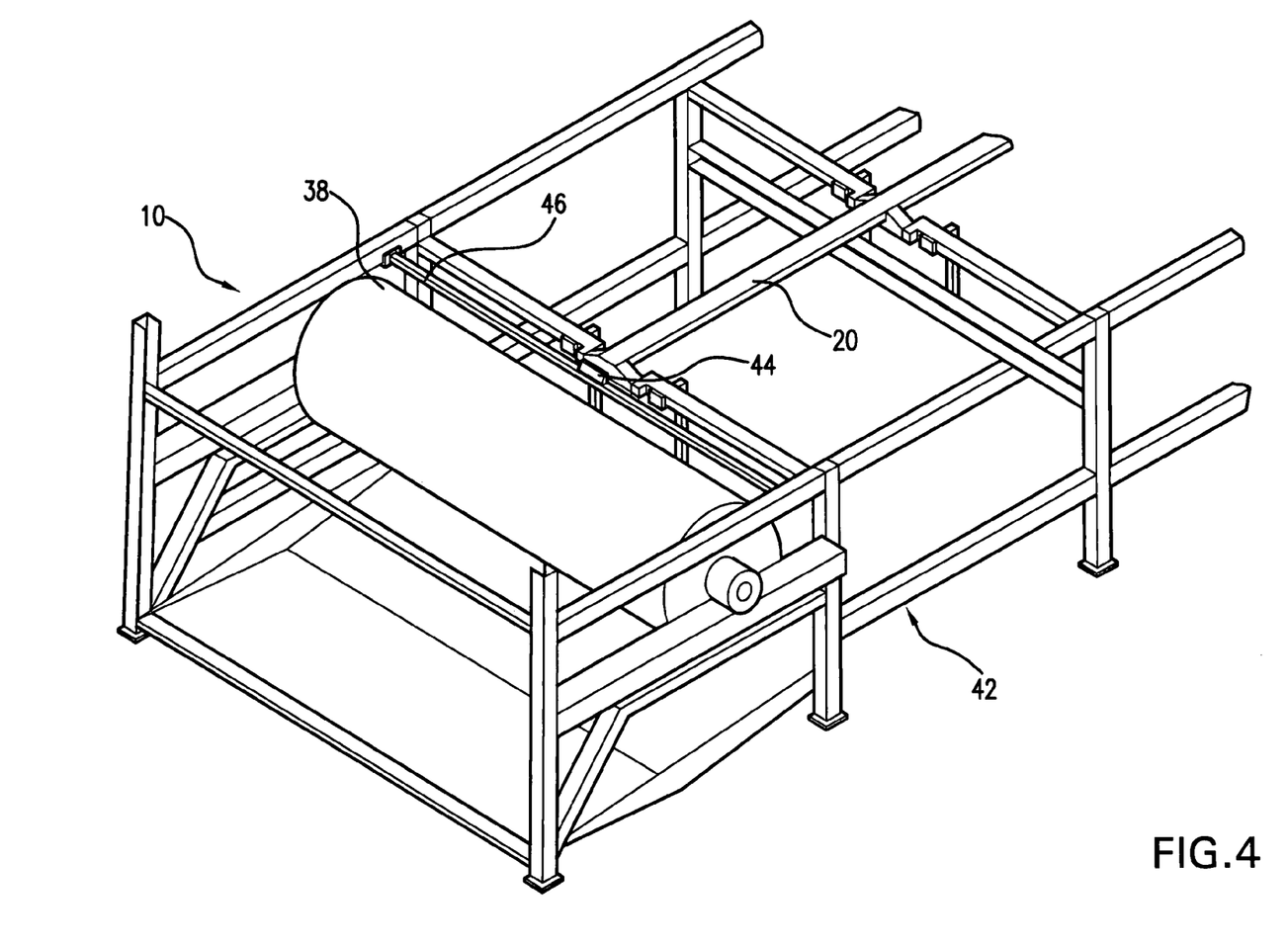
FIG. 4 is a schematic perspective view of a roller structure with a position sensor for detecting misalignments between the drain holes in the drainage belt and the underlying vacuum pan.

FIG. 4 illustrates the feed end 10 of a horizontal belt filter with the drainage belt 16 and associated support rollers removed to show the frame 42 and the vacuum pan 20 underlying the belt during operation. As clearly visible in the figure, the vacuum pan 20 is fixed along the longitudinal axis of the belt frame 42 to receive filtrate drawn from the filter medium 12 through the drain holes 18 positioned all along the centerline of the drainage belt 16 (see also FIGS. 1-3). According to the invention, a position sensor 44 is installed in the vicinity of the take-up pulley 38 to detect any misalignment between the drain holes of the belt 16 and the centerline of the vacuum pan 20. The detector 44 is preferably supported by a cross-bar 46 in front of the feed end of the vacuum pan 20, so that a misalignment of the belt is immediately sensed as the belt begins its travel along the belt line after rolling around the take-up pulley 38.

The detector 44 may consist of any sensor capable of detecting a lateral shift in the drain holes 18 that pass sequentially by the sensor. For example, a sonic sensor cell may detect the change in sound produced by a progressively smaller opening facing the sensor, as would occur when the belt moves laterally to one side or the other of the sensor. Two additional sensor cells could be placed laterally, adjacent the central cell, to determine the direction of lateral shift. That is, as the central cell senses a change in sound response, the adjacent cell in the direction of lateral shift would also detect a change in sound response (while the other adjacent cell would not), thereby identifying the direction of lateral shift of the belt.

Figure 5:
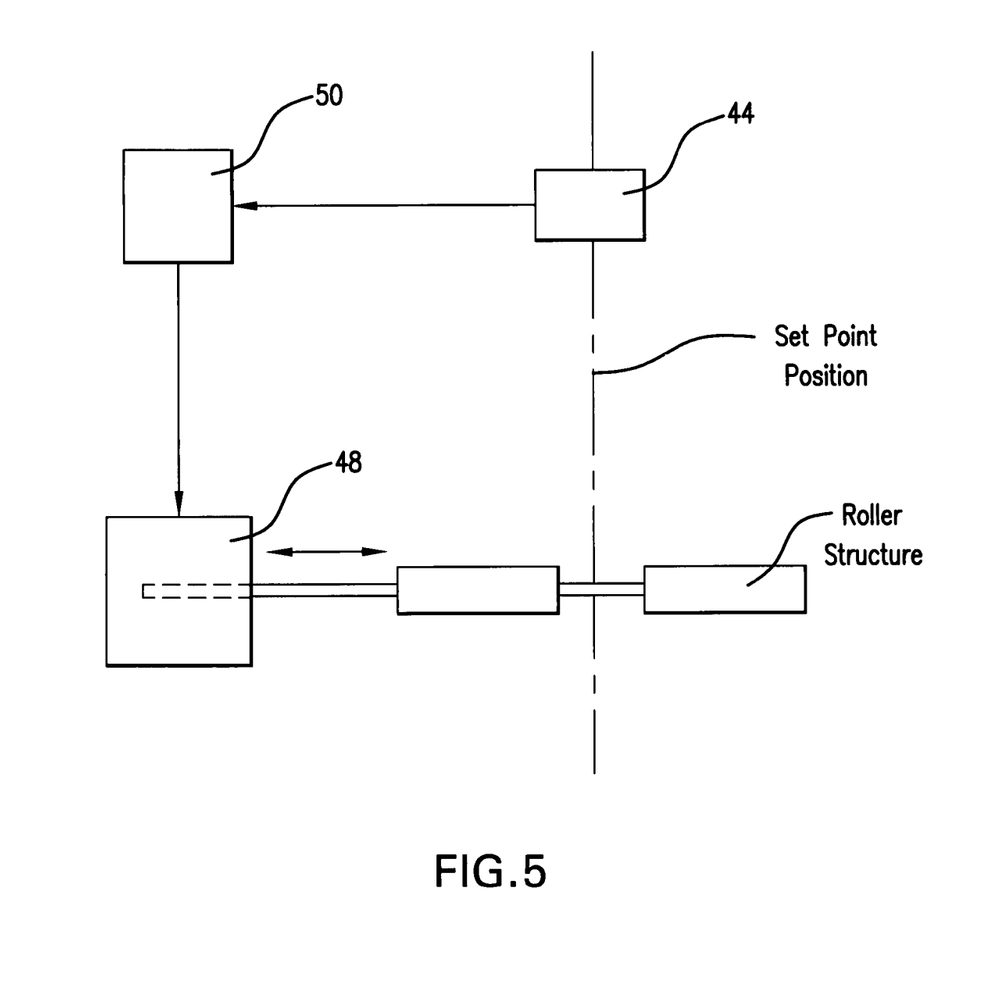
FIG. 5 is a diagram of the feedback control utilized to implement the invention.

According to the invention, when a lateral shift in belt position with respect to a set point is sensed by the detector 44, an appropriate signal is sent to an actuator 48 through a controller module 50, as illustrated in the diagram of FIG. 5, to move the roller structure supporting the drainage belt in the direction opposite to the lateral shift as necessary to realign the drain holes with the vacuum pan. In typical feedback-control mode, the motion of the roller structure is commensurate with the lateral shift measured by the detector 44 with a gain set to achieve alignment as rapidly as possible without unwanted oscillations or instability.

Figure 6:
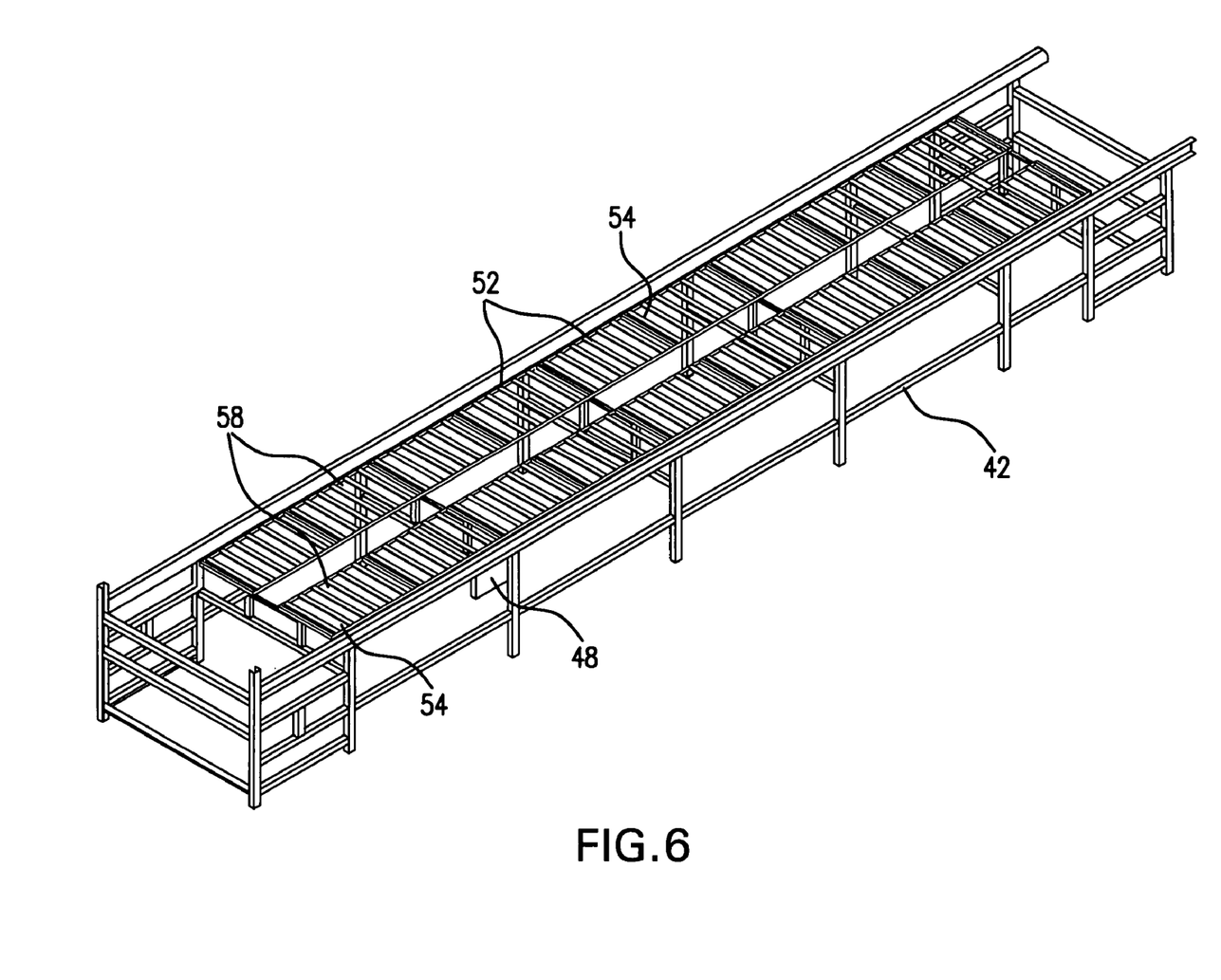
FIG. 6 is a perspective schematic view of a typical roller structure and frame of a horizontal belt filter.
Figure 7:
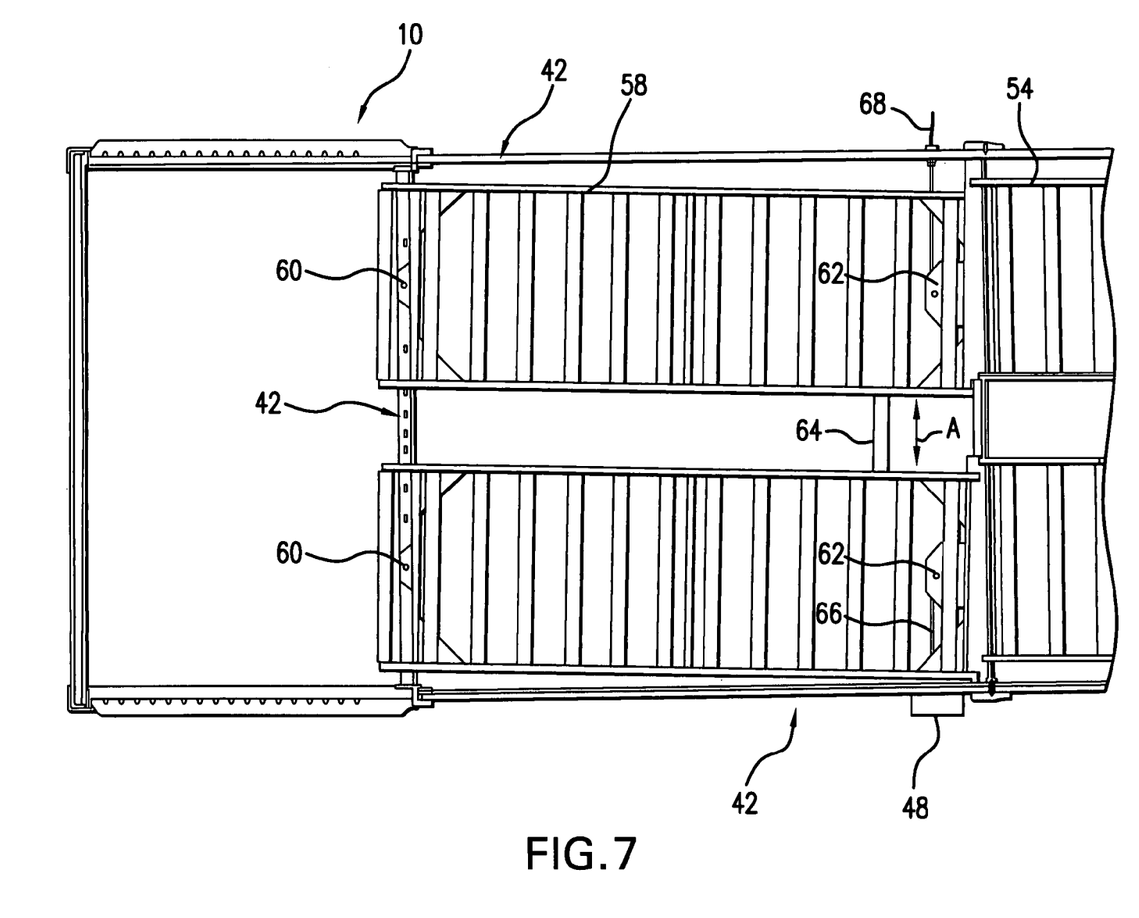
FIG. 7 is a schematic representation in top view of a movable roller structure according to the invention.

FIGS. 6 and 7 illustrate a roller structure fitted with a mechanism for moving the roller decks at the feed end 10 of the filter line and the overlying drainage belt (not shown) laterally according to the invention. Every belt line comprises a sequence of top roller sections 52 each having a plurality of individual rollers 54 supporting the belt as it travels between the take-up and drive pulleys. Alternatively, the drainage belt may have incorporated on its bottom a cloth impression finish to increase the friction force between the roller sections and the belt thereby increasing belt movement response. Each section 52 includes side-by-side roller decks attached to the frame 42. Bottom rollers 56 (see FIG. 3) similarly support the belt 16 as it returns on the underside of the conveyor. According to the invention, a section 58 of top rollers is connected to a push-pull mechanism 48 capable of moving the roller decks, or a portion of the decks, laterally with respect to the longitudinal axis of the belt.

For example, as illustrated in FIG. 7, each roller deck of the section 58 may be connected at one end to the frame 42 through a fixed hinge 60 allowing the deck to move laterally at the other end, as illustrated by the arrow A. The actuator 48 is attached to the frame 42 and connected to the other ends of the roller decks through floating hinges 62 and provides the lateral motion required for alignment of the overlying belt. A connecting structure 64 is illustrated to couple the motion of the two roller decks of the movable section 58. The actuator 48 may be, for instance, a reversible motor acting on a worm screw through a set of gears and a pushrod 66 on one side of the roller section 58, so as to provide motion in either lateral direction as required to move the rollers to re-establish the alignment of the holes in the drainage belt with the underlying vacuum pan. The other side of the roller section 58 may be supported by another rod 68 slidably mounted on the belt frame 42.

Based on tests of prototypes of the belt alignment system described above, it is expected that it is possible to maintain continuity of suction throughout the entire belt line for a belt as long as 45-50 meters by installing the mechanism of the invention at the feed end of the line. Therefore, this position is preferred. For longer belts, multiple movable sections can be used at different locations along the length of the belt, such as at both ends of a 60-70 meter line.

Every belt line is driven by a drive pulley at the discharge end 30 of the line (see FIG. 1). It is known that the belt tends to move laterally when the axis of the drive pulley is not perfectly perpendicular to the longitudinal axis of the belt and that vibrations in the pulley structure or slight misalignments can produce the same effect. Typical belt drives consist of a motor connected to one side of the drive pulley, thereby providing a driving force that can become unbalanced under the high level of tension applied by the belt to the drive pulley. Therefore, according to another aspect of the invention, a dual-drive system is preferably used to run the belt line.

Figure 8:
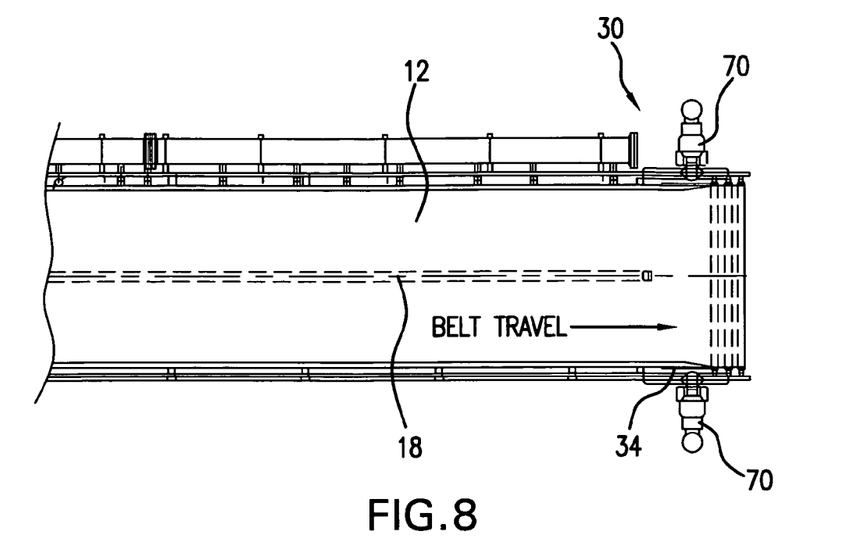
FIG. 8 is a partial plan view of the discharge end of a horizontal belt filter with two drives connected to the drive pulley according to the invention.
Figure 9:
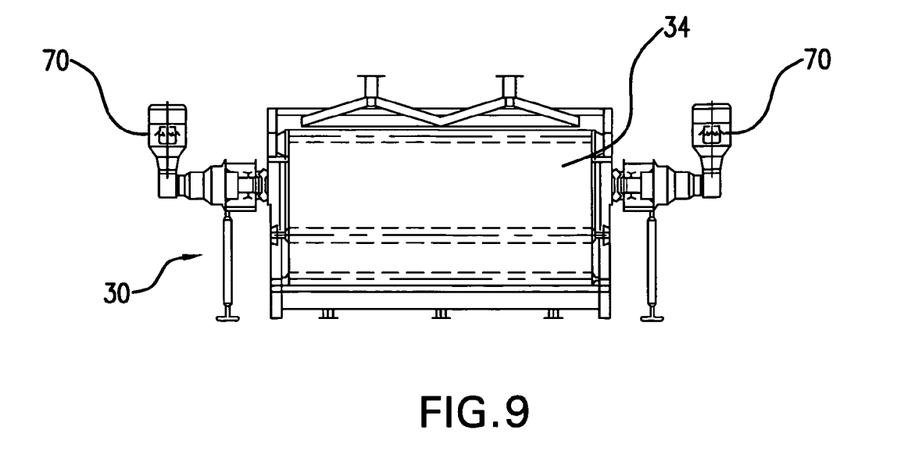
FIG. 9 is an elevational end view of the discharge end of the horizontal belt filter of FIG. 8.

As illustrated in plan view in FIG. 8, two drive mechanisms 70, such as electric motors, are used to produce rotation of the drive pulley 34 at the discharge end 30 of the belt line. FIG. 9 shows two such motors in elevational view from the end of the line. As those skilled in the art would readily recognize, the two drive mechanisms are synchronized so as to provide the exact same torque to each end of the drive pulley 34, thereby ensuring that a uniform traction force is applied across the width of the belt. This drive configuration has the additional advantage of providing greater driving force, which in turn allows longer belt lines to be used to achieve greater throughput.

Various changes in the details, steps and components that have been described may be made by those skilled in the art within the principles and scope of the invention herein illustrated and defined in the appended claims. For example, while the invention has been described in terms of a sonic detector 44, it is clear that any sensor or combination of sensors capable of detecting a lateral shift of the drain holes of the belt with respect to the vacuum pan could be used in similar manner to maintain alignment according to the invention. For example, optical sensors and electrical (such as capacitance or inductance-based proximity sensors) are believed to be suitable to practice the invention. Similarly, a variety of mechanisms could be used to shift the roller decks laterally in response to a control signal to realign the drain holes with the vacuum pan. These include, without limitation, stepper motors, servo motors, pneumatic or hydraulic cylinders, and even manual devices.

Thus, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A horizontal belt filter comprising:
    a roller structure with a plurality of top roller sections, each section comprising a pair of side by side decks each containing a plurality of rollers;
    a drainage belt supported by said plurality of top roller sections, said drainage belt including drain holes;
    a vacuum pan underlying said drain holes;
    a detector for sensing a position of the drain holes relative to the vacuum pan; and a mechanism for moving one or more of the top roller sections laterally to thereby move the plurality of rollers in the sections to align the drain holes with the vacuum pan in response to a signal from the detector indicating a misalignment between the drain holes and the vacuum pan.

2. The horizontal belt filter of claim 1, wherein said one or more of the top roller sections is hinged at one end thereof to the roller structure and is connected at another end thereof to a pushrod actuated by said mechanism.

3. The horizontal belt filter of claim 1, wherein said detector includes a sonic sensor.

4. The horizontal belt filter of claim 1, wherein said drainage belt is driven by a drive pulley coupled to two drive mechanisms, one drive mechanism at each end of the drive pulley.

5. The horizontal belt filter of claim 1, wherein one of said one or more of the top roller sections is located at a feed end of the belt filter.

6. The horizontal belt filter of claim 5, wherein said one of said one or more of the top roller sections is hinged at one end thereof to the roller structure and is connected at another end thereof to a pushrod actuated by said mechanism.

7. A method for maintaining an alignment of drain holes in a drainage belt with an underlying vacuum pan in a horizontal belt filter, comprising the following steps:
    detecting a position of the drain holes relative to the vacuum pan; and
    moving a top roller section comprising a pair of side by side decks each containing a plurality of rollers supporting the drainage belt laterally to align the drain holes with the vacuum pan in response to a signal generated by the detecting step indicating a misalignment between the drain holes and the vacuum pan.

8. The method of claim 7, wherein said moving step is carried out with one end of said top roller section hinged to a belt structure and with another end of the top roller section connected to a pushrod actuated by a push-pull mechanism.

9. The method of claim 7, wherein said detecting step is carried out with a sonic sensor.

10. The method of claim 7, wherein said drainage belt is driven by a drive pulley coupled to two drive mechanisms, one drive mechanism at each end of the drive pulley.

11. The method of claim 7, wherein said top roller section is located at a feed end of the belt filter.

12. The method of claim 11, wherein said moving step is carried out with one end of said top roller section hinged to a belt structure and with another end of the top roller section connected to a pushrod actuated by a push-pull mechanism.

* * * * *